(12) United States Patent
Yu

(10) Patent No.: US 6,870,527 B2
(45) Date of Patent: Mar. 22, 2005

(54) POINTING DEVICE

(75) Inventor: Ching Ching Yu, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 257 days.

(21) Appl. No.: 10/352,049

(22) Filed: Jan. 28, 2003

(65) Prior Publication Data

US 2004/0145569 A1 Jul. 29, 2004

(51) Int. Cl.[7] ................................................. G09G 5/08
(52) U.S. Cl. ....................................... 345/163; 345/167
(58) Field of Search ............................... 345/156, 157, 345/163, 167, 164

(56) References Cited

U.S. PATENT DOCUMENTS

| | | | | |
|---|---|---|---|---|
| 4,952,919 A | * | 8/1990 | Nippoldt | ..................... 345/167 |
| 5,162,780 A | * | 11/1992 | Solhjell | ..................... 345/164 |
| 5,171,978 A | * | 12/1992 | Mimlitch et al. | ........... 250/221 |
| 5,621,436 A | * | 4/1997 | Solhjell | ..................... 345/163 |
| 5,790,098 A | * | 8/1998 | Lin | ............................. 345/163 |
| 5,926,167 A | * | 7/1999 | Niitsuma et al. | ........... 345/156 |
| 6,256,013 B1 | * | 7/2001 | Siddiqui | ..................... 345/163 |

* cited by examiner

*Primary Examiner*—Kent Chang
(74) *Attorney, Agent, or Firm*—Rosenberg, Klein & Lee

(57) ABSTRACT

A pointing device includes a casing in which a track ball is rotatably received and physically engaging two substantially perpendicular rotatable axles and a biasing structure forcibly biasing the track ball toward the axles. The biasing structure includes a frame rotatably supported inside the casing by pivots and a retainer mounted to the frame. The retainer includes a plurality of pawls spaced along a circumference to form a space for rotatably receiving and retaining a sphere. A biasing element is arranged between the casing and the frame to bias the sphere to forcibly engage the track ball thereby forcing the track ball against the rotatable axles.

6 Claims, 4 Drawing Sheets

POINTING DEVICE

BACKGROUND OF THE INVENTION

1. Field of the Invention

The present invention generally relates to a pointing device, and in particular to a track ball based pointing device of which a biasing force is indirectly applied to the track ball by means of a sphere.

2. The Related Art

Pointing devices, such as a computer mouse, comprise a casing inside which a track ball is rotatably received. The track ball engages and frictionally drives a first axle (X-axis) and a second axle (Y-axis) to generate signals corresponding to movement of the mouse which in turn controls the movement of a cursor on a display screen. To ensure the frictional engagement between the track ball and the axles, biasing means is provided to force the track ball against the axles. Conventionally, the biasing force is applied indirectly to the track ball by means of a rotatable shaft. In other words, the rotatable shaft is biased against the track ball and the interaction between the shaft and the track ball in turn forces the track ball against the first and second axles.

When the track ball is rotated in a direction substantially inconsistent with the rotational direction of the shaft, the track ball is subject to a resistance caused by friction induced by relative movements of the track ball and the shaft in different directions. The movement of the cursor on the display screen becomes unstable and is not synchronous with the mouse, leading to incorrect operation of the computer.

Thus, it is desired to have a pointing device that does not have the deficiency of the conventional pointing devices.

SUMMARY OF THE INVENTION

An object of the present invention is to provide a pointing device comprising a track ball that is indirectly biased by means of a spherical member to eliminating the potential undesired relative movement therebetween.

Another object of the present invention is to provide a pointing device that ensures proper operation of a screen cursor.

To achieve the above objects, in accordance with the present invention, there is provided a pointing device comprising a casing in which a track ball is rotatably received and physically engaging two substantially perpendicular rotatable axles and a biasing structure forcibly biasing the track ball toward the axles. The biasing structure comprises a frame rotatably supported inside the casing by pivots and a retainer mounted to the frame. The retainer comprises a plurality of pawls spaced along a circumference to form a space for rotatably receiving and retaining a sphere. A biasing element is arranged between the casing and the frame to bias the sphere to forcibly engage the track ball thereby forcing the track ball against the rotatable axles. The sphere and the track ball forms a point contact which help eliminating undesired relative movement therebetween thereby ensuring proper operation of the pointing device to control a screen cursor.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
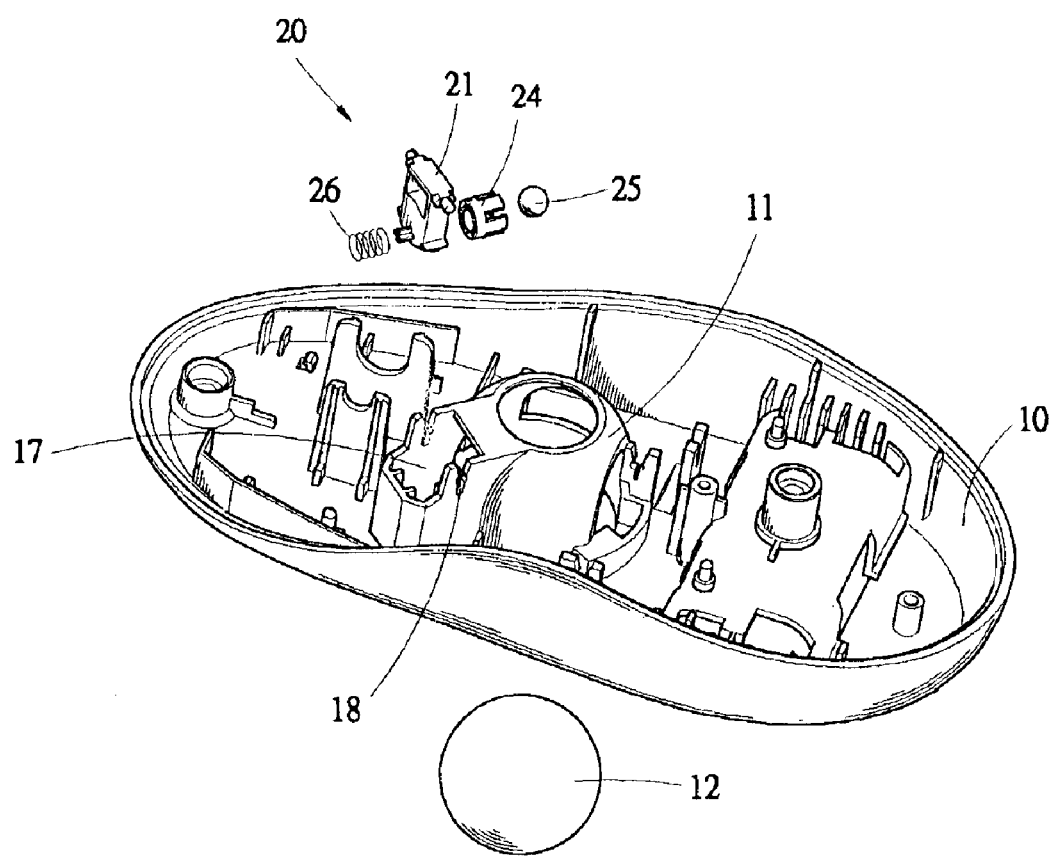
FIG. 1 is a perspective view of a pointing device constructed in accordance with the present invention with a portion of a casing removed to show inside structure.
Figure 4:
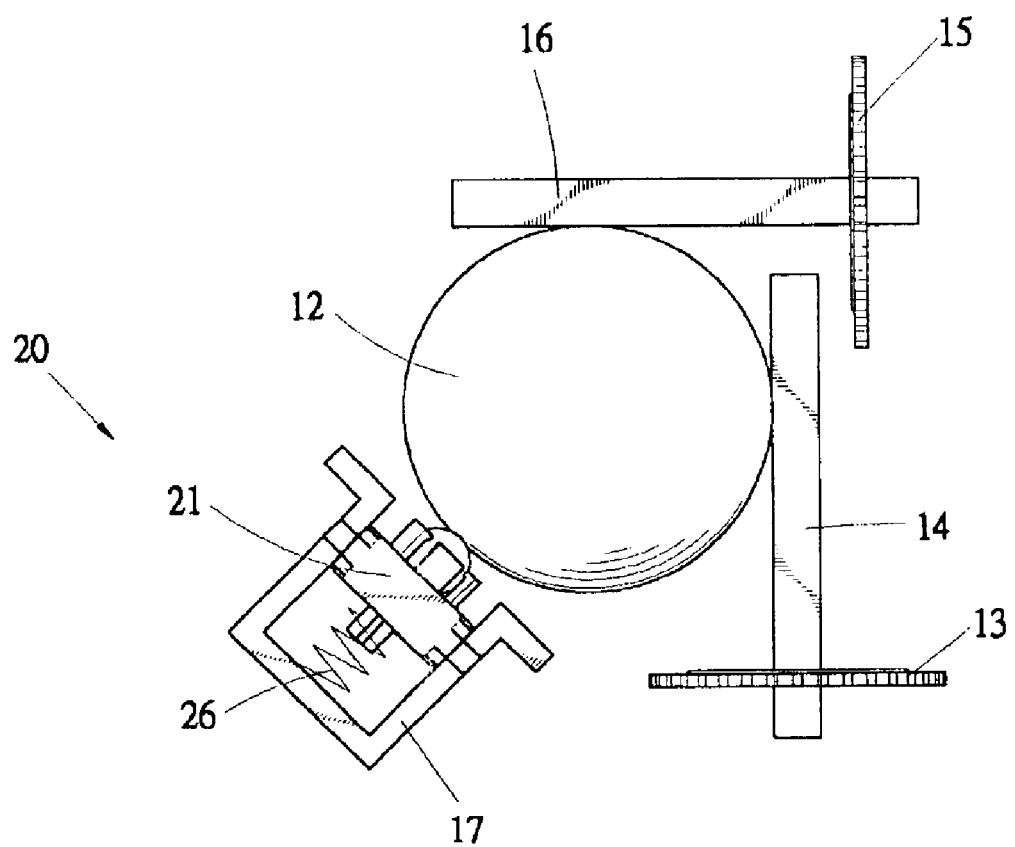
FIG. 4 is a schematic top view showing spatial relationship of a track ball and the biasing structure of the present invention.

With reference to the drawings and in particular to FIGS. 1 and 4, a pointing device constructed in accordance with the present invention comprises a casing 10 in which a track ball receptacle 11 is defined for rotatably accommodating a track ball 12. The track ball 12 physically engages first and second axles 14, 16 that are rotatably supported inside the casing 10 and substantially perpendicular to each other. When the pointing device is moved and rotates the track ball 12, the rotation is transmitted to the first and second axles 14, 16 to generate signals corresponding to the movement of the pointing device.

Optical detectors 13, 15, such as circular grating plates, are respectively mounted to the axles 14, 16 to generate the signals corresponding to the movement of the pointing device. The optic detectors 13, 15 are well known in the art and no further detail will be given herein.

A chamber 17 is formed in the casing 10 and in communication with the track ball receptacle 11. The chamber 17 is defined by opposite and spaced sidewalls (not labeled) in which aligned notches 18 are defined.

Figure 2:
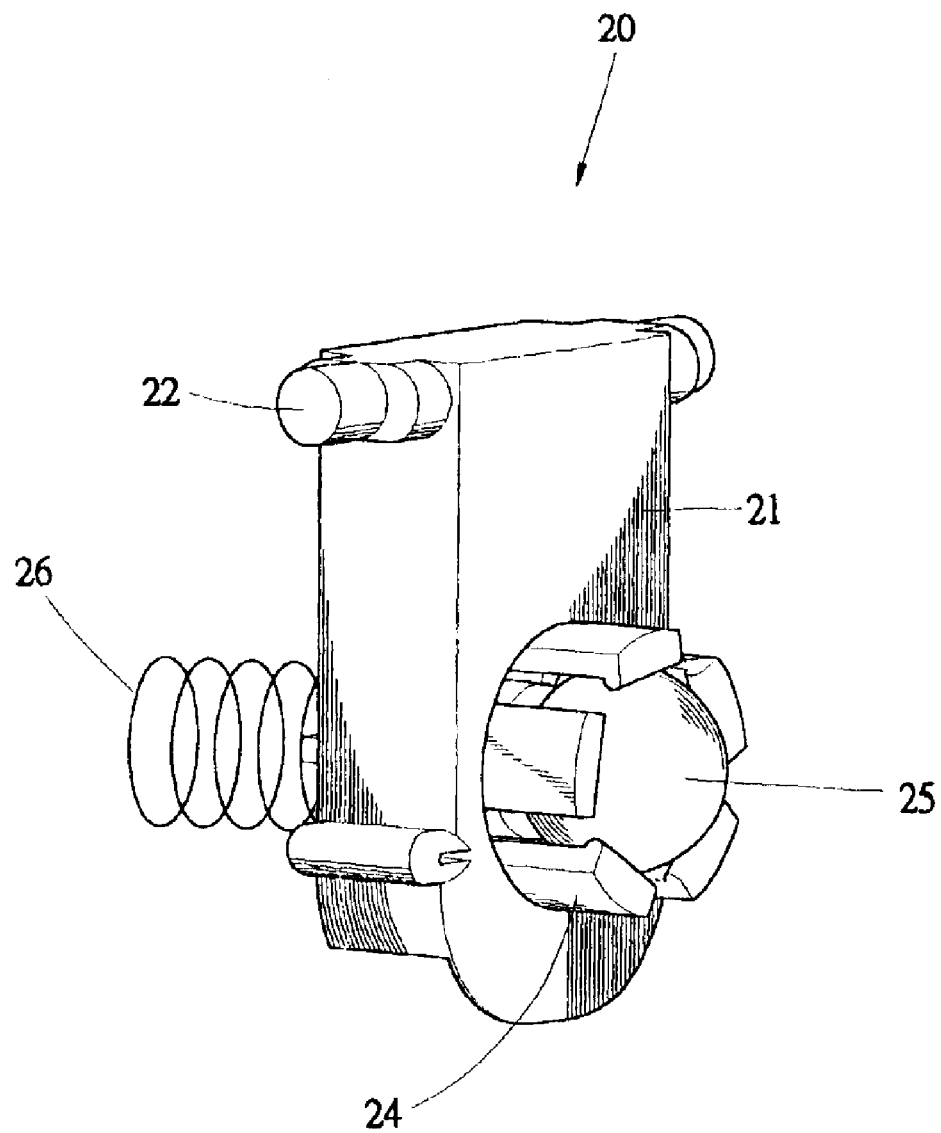
FIG. 2 is a biasing structure of the pointing device in accordance with the present invention.
Figure 3:
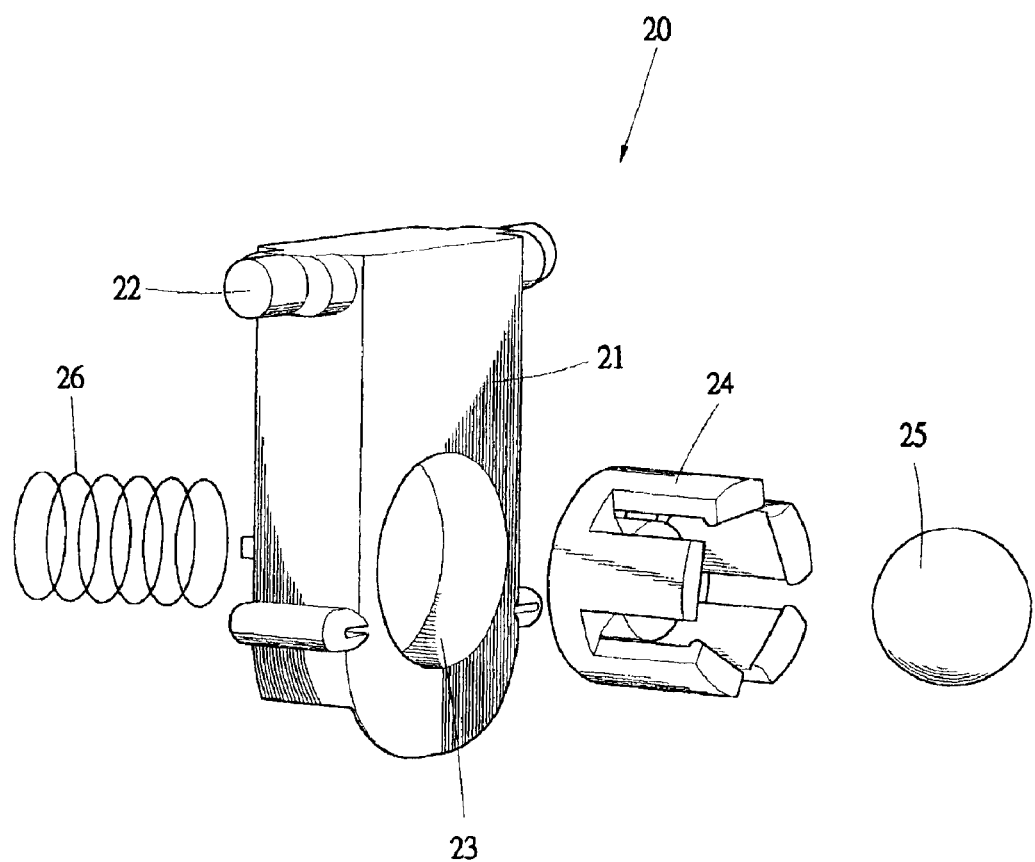
FIG. 3 is an exploded view of the biasing structure of FIG. 2.

Also referring to FIGS. 2 and 3, a biasing structure 20 is movably accommodated in the chamber 17 for physically engaging the track ball 12. The biasing structure 20 comprises a frame 21 having opposite pivots 22 rotatably received in the notches 18 of the chamber 17 for rotatably supporting the biasing structure 20 in the chamber 17. A hole 23 is defined in the frame 21. A retainer 24 is received and fixed in the hole 23. The retainer 24 comprises a plurality of pawls spaced along a circumference to form a space for rotatably accommodating a sphere 25. The pawls form barbs for engaging and retaining the sphere 25 in the retainer 24. The sphere 25 partially projects outside the retainer 24 to physically engage the track ball 12.

The biasing structure 20 further comprises a resilient member 26, such as a helical spring, arranged between a fixed end wall (not labeled) of the chamber 17 and the retainer 24 for biasing the retainer 24 in a direction where the sphere 25 is forced against the track ball 12. The rotatable coupling between the frame 21 and the chamber 17 by the pivots 22 allows the resilient member 26 to force the sphere 26 in a direction against the track ball 12. A point contact is present between the track ball 12 and the sphere 25, which eliminates the undesired relative movement between the track ball and the biasing device observed in the conventional pointing devices.

The sphere 25 is made of any suitable material, such as steel and plastics. The resilient member 26 can be made of any suitable resilient material in any desired form, such as spring or a rubber block.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A pointing device comprising:
 a casing in which a track ball is rotatably received and physically engaging at least one rotatable axle; and
 a biasing structure comprising:
  a frame movably supported inside the casing,
  a retainer mounted to the frame and rotatably receiving and retaining a sphere, and
  a biasing element arranged between the casing and the frame to bias the sphere to forcibly engage the track ball thereby forcing the track ball against the rotatable axle.

2. The pointing device as claimed in claim 1, wherein the retainer comprises a plurality of pawls spaced along a circumference to form a space for rotatably accommodating the sphere.

3. The pointing device as claimed in claim 1, wherein the biasing structure is rotatably supported inside the casing by pivots rotatably received in notches defined in the casing whereby the biasing structure is rotatable in a direction allowing the sphere to engage the track ball.

4. The pointing device as claimed in claim 1, wherein the biasing element comprises a helical spring.

5. The pointing device as claimed in claim 1, wherein the frame defined a hole in which the retainer is received and fixed.

6. The pointing device as claimed in claim 1 comprising first and second rotatable axles extending in directions substantially perpendicular to each other.

* * * * *